United States Patent [19]

Tachida

[11] 4,199,124
[45] Apr. 22, 1980

[54] STRUCTURE FOR CONNECTING A LEG TO A MASSIVE BODY

[75] Inventor: Hiroki Tachida, Shizuoka, Japan

[73] Assignee: Nippon Gakki Seizo Kabushiki Kaisha, Japan

[21] Appl. No.: 849,507

[22] Filed: Nov. 7, 1977

[30] Foreign Application Priority Data

Nov. 8, 1976 [JP] Japan .......................... 51-150297[U]

[51] Int. Cl.² ............................................ F16M 11/16
[52] U.S. Cl. .................... 248/188; 403/189; 403/198; 403/199; 403/200
[58] Field of Search ................ 248/188, 188.8, 223.1, 248/223.2, 222.4; 403/189

[56] References Cited

U.S. PATENT DOCUMENTS

| | | | |
|---|---|---|---|
| 527,145 | 10/1894 | Dempsey | 403/189 |
| 908,751 | 1/1909 | Cooke | 248/222.4 |
| 1,571,762 | 2/1926 | Driscoll | 248/222.4 X |
| 1,762,776 | 6/1930 | Gardner | 248/188 X |
| 2,855,256 | 10/1958 | Nelson | 248/188 X |
| 2,869,950 | 1/1959 | Boccone | 248/188 X |
| 2,882,110 | 4/1959 | Mutchnik | 248/188 X |
| 2,973,233 | 2/1961 | McPhee | 248/188 X |
| 3,228,359 | 1/1966 | Rich | 248/188.8 X |
| 3,267,888 | 8/1966 | Carlson | 248/188 X |
| 3,406,935 | 10/1968 | Mutchnik et al. | 248/188 |

*Primary Examiner*—William H. Schultz
*Attorney, Agent, or Firm*—Ostrolenk, Faber, Gerb & Soffen

[57] ABSTRACT

A leg is coupled to one half of the connecting structure, e.g. a detachable seat, via screw engagement and the latter is coupled, via wedge engagement to be established by projections formed thereon, to the other half of the connecting structure, e.g. a fixed seat, mounted to the bottom of a massive body such as a keyboard musical instrument, a larger sized television set and a heavy table. Registration of the leg at the correct position and the above-described wedge engagement are carried out simply by sliding the one seat against the other seat with alleviated trouble in the collimation work, reduced damage on the thread construction and stabilized support for the massive body.

12 Claims, 20 Drawing Figures

STRUCTURE FOR CONNECTING A LEG TO A MASSIVE BODY

BACKGROUND OF THE INVENTION

The present invention relates to improved structure for connecting a leg to a massive body, and more particularly relates to an improvement in a structure for detachably connecting a supporting leg to the bottom of a massive body such as a keyboard musical instrument, a large-sized television set and a heavy table.

Massive bodies of the above-described type are in general supported by a plurality of legs standing on the floor and, in order to assure stable support, it is preferred to set the legs somewhat inclined to the vertical direction. Thus, the total space to be occupied by the massive body including the legs is very large and such a bulky construction accompanied by the heavy weight is quite inconvenient for transportation of the body.

In order to avoid this problem, it is proposed to make the legs detachable from the massive body. That is, the legs are detached from the massive body during transportation and attached to the massive body again when the latter is to be set in position.

Several connecting structures have been proposed for this purpose. In one example, the top end of the leg is directly connected to the bottom of the body via screw engagement. In the other examples, the top end of the leg is connected to an intervening seat via screw engagement and the seat is fixed to the bottom of the body goods. In any case, the connection between the leg and the body is dependent upon the screw engagement only.

The foregoing connecting system possesses several fatal drawbacks, as hereinafter described in more detail, such as trouble in the collimation work preceding the screw engagement, damage to the thread construction caused by faulty collimation, stress concentration on the thread construction to be caused by lateral load accidentally imposed on the body and unstable support to be resulted from shaky movement of the legs supporting the body.

SUMMARY OF THE INVENTION

It is one object of the present invention to provide a novel structure for connecting legs to a massive body with considerably alleviated trouble in the collimation work.

It is another object of the present invention to provide a novel structure for easily connecting legs to a massive goods while successfully avoiding damage on the thread constructon.

It is the other object of the present invention to provide a novel structure for safely connecting legs to a massive body without the danger of stress concentration on the thread construction which otherwise seriously shorten the life of the screw engagement.

It is a further object of the present invention to provide a novel structure for reliably connecting legs to a massive body while assuring stable support excellently resisting shaky movement of the legs.

In accordance with the present invention, the structure is comprised of two mutually separable halves, i.e. a fixed seat and a detachable seat. The fixed seat is adapted for fixed mounting to the bottom of the massive body and the detachable seat is coupled to the leg top via screw engagement. Coupling of the two seats is effected by wedge engagement between projections formed on one seat and corresponding number of specially contoured through holes formed in the other seat, which is established simply by sliding one seat against the other seat along mating surfaces of the two.

DESCRIPTION OF THE PREFERRED EMBODIMENTS

As already described, the connecting structure in accordance with the present invention is advantageously used in connection with a massive body such as a keyboard musical instrument, a television set or a table in which application of lateral force or forces to the body being supported imposes serious shearing load on the connection of the body with the legs.

Figure 1:
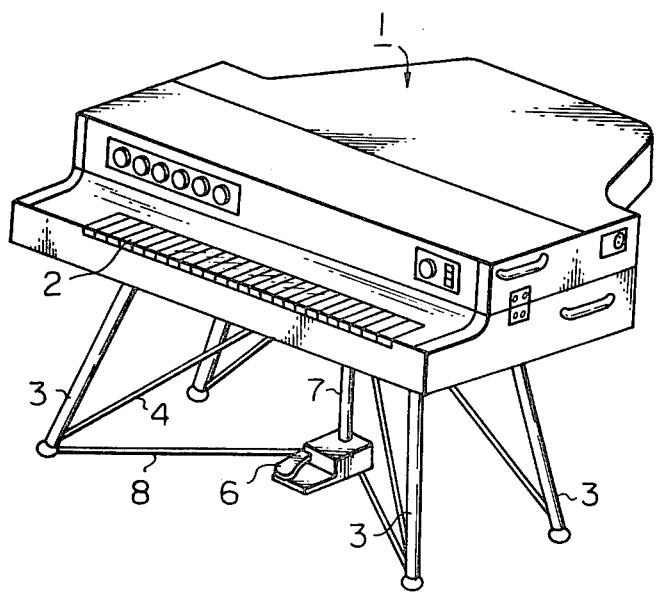
FIG. 1 is a perspective view of an electric grand piano as an example of the massive body to which the present invention is advantageously applicable.

One example of such a massive body is an electric grand piano such as shown in FIG. 1, in which the piano comprises a casing 1 (the massive body) in which the known frame assembly and action assembly are located. A number of keys 2 are arranged side by side on the front side of the casing 1. The casing 1 is supported by four legs 3 detachably connected to the bottom thereof via suitable seats not shown. Wire stays 4 are provided for the purpose of stabilizing the support. A pedal assembly 6 is operably connected to the known damper assembly (not shown) in the casing 1 via a pedal rod 7. The pedal assembly 6 is tightly connected to the legs 3 via chain stays 8 which stabilize the support thereof. The piano is further provided, as in the common electric grand pianos, with a number of auxiliary elements such as a control dial panel, an electric input, an electric power supply, an amplifier and so on but explanation as to such elements is omitted herein for the purposes of simplicity.

Figure 2:
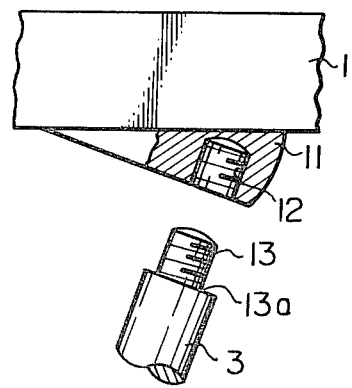
FIGS. 2 through 4 are side views, partly in section, of various examples of the conventional connecting structure used for supporting massive body.

One example of the conventional connecting structure is shown in FIG. 2, in which the structure comprises a seat 11 formed on the bottom of the casing 1 and provided with a threaded hole 12, and a threaded projection 13 formed atop the leg 3. For assembling of the leg 3 with the casing 1, the center of the projection 13 is first collimated to that of the hole 12 and the projection 13 is then brought into screw engagement with the seat 11 by axially rotating the leg 3.

Due to the fact that the above-described collimation has to be carried out on the underside of the massive casing 1, the operation is very difficult and slight error in the collimation tends to cause faulty screw engagement between the projection 13 and the seat 11, which can damage the thread construction. Damage on the thread construction naturally results in loose connection of the leg 3 with the casing 1, i.e. unstable support of the casing 1 by the leg 3. In addition, since coupling of the leg 3 to the massive casing 1 is maintained solely by the screw engagement of the thin projection 13 with the seat 11, application of lateral force or forces to the casing 1, especially when such force is impulsive, imposes a great deal of shearing stress on the thin projection 13. This shearing stress is concentrated upon the junction 13a between the projection 13 and the leg 3. Repeated generation of such stress concentration promotes fatigue at the junction which results in early breakage of same. Further, the above-described loosening in the connection allows free relative displacement of the projection 13 in the seat 11 which tends to assist the above-described fatigue of the junction 13a.

Figure 3:
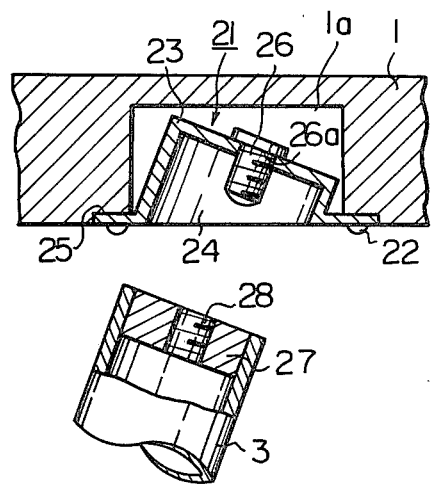

Another example of the conventional connecting structure is shown in FIG. 3, in which the structure comprises a fixed seat 21 mounted to the bottom of the casing 1 via set screws 22. The fixed seat 21 comprises a center portion 23 defining a circular cavity 24 and a rim 25 for the set screws 22. The casing 1 is provided with a hollow 1a which receives the center portion 23 of the fixed seat 21. A threaded bolt 26 is screwed to the center portion 23 of the fixed seat 21 so as to project into the circular cavity 24 whose inside contour snugly meets with the outside contour of the leg 3. The upper portion of leg 3 is tubular and includes an end piece 27 fixed to the top end therefore. The end piece 27 is provided with a threaded hole 28. When connecting the leg 3 to the casing 1, the center of the leg 3 is first collimated to that of the center portion 23 of the fixed seat 21 and the bolt 26 is then brought into screw engagement with the end piece 27 by axially rotating the leg 3.

As with the prior art illustrated in FIG. 2, the prior art of FIG. 3 exhibits a collimation problem. The problem in this case is, however, even more serious than that in the first example. As described above, collimation must be established between the leg 3 and the center portion 23 of the fixed seat 21 in the embodiment of FIG. 3 rather than between the bolt 26 and the end piece hole 28. As a result, bolt 26 has to be exactly centered within the center portion 23 of the fixed seat 21 and, likewise, the end piece hole 28 has to be highly centered in the leg 3. Poor accuracy in the centering of these cooperating elements inevitably amplifies the collimation problem. In addition to this centering problem, some idleness is required to smoothly couple the leg 3 to the center portion 23 of the fixed seat 21. This loose coupling again tends to cause thread breakage. In addition, although embodiment of FIG. 3 helps reduce the stress problem existing in the embodiment of FIG. 2, some stress concentration problems remain. That is, the lateral force or forces imposed on the massive casing 1 generates stress concentration at the neck 26a of the bolt 26 in screw engagement with the leg end piece 27.

Figure 4:
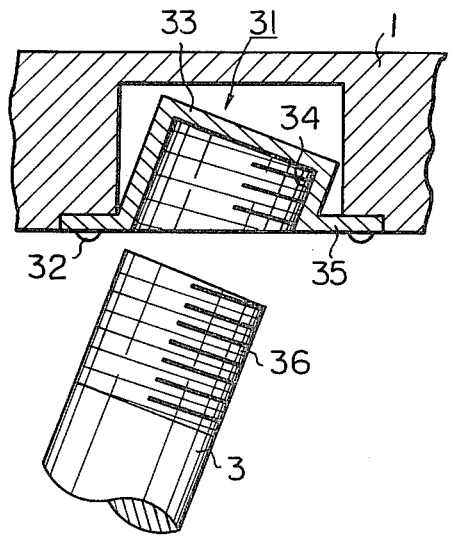
Figure 5:
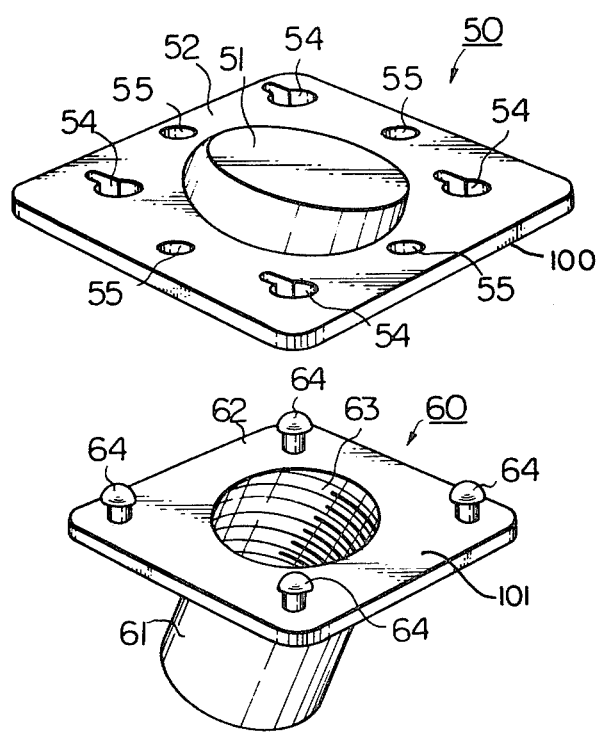
FIG. 5 is a perspective view of one embodiment of the connecting structure in accordance with the present invention in a disassembled state.

Yet another example of the conventional connecting structure is shown in FIG. 4, in which the structure comprises a fixed seat 31 mounted to and fully embedded in the bottom of the casing 1 via set screws 32. The fixed seat 31 comprises a center portion 33 with a theaded cavity 34 and a rim 35 for the set screws 32. The leg 3 is provided with an externally threaded top portion 36. To connect the leg 3 to the casing 1, the center of the leg 3 is first collimated with the center portion 33 of the fixed seat 31 and the leg top portion 36 is then brought into screw engagement with the fixed seat 31 by axially rotating the leg 3.

Similar to the foregoing examples, this example again is not full of the collimation problem. From the view point of load problem, the shearing stress caused by lateral force or forces acting on the massive casing has to be directly borne by the threaded top end portion of the leg 3 and this leads to expedited fatigue in the thread construction.

One embodiment of the connecting structure in accordance with the present invention is shown in FIGS. 5 through 7B, in which the structure comprises, as major elements, a fixed seat 50 to be fixedly mounted to the bottom of the casing and a detachable seat 60 to be detachably coupled to the fixed seat 50 as hereinafter described in more detail.

Figure 6A:
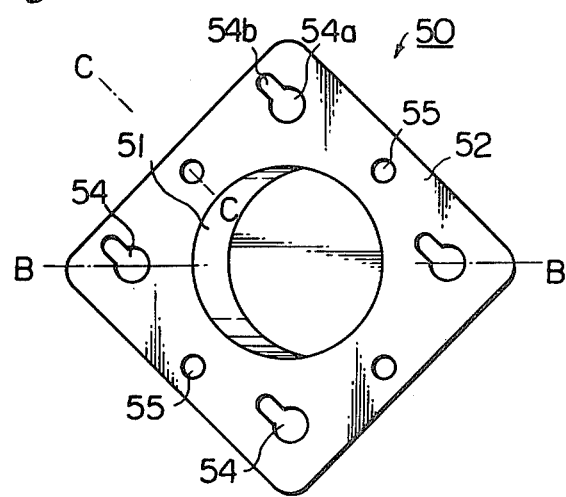
FIG. 6A is a top view of the fixed seat used in the connecting structure shown in FIG. 5.
Figure 6B:
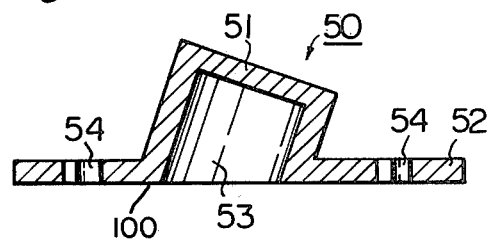
FIG. 6B is a section taken along the line B—B in FIG. 6A.

As best seen in FIG. 6B, the fixed seat 50 comprises a center portion 51 and a flat rim 52. The center portion 51 projects from one side of the rim 52 in order to define a circular cavity 53 opening in the mating surface 100 of the rim 52. The inner diameter of cavity 53 is preferably larger than the outer-most diameter of the externally threaded portion 3a of leg 3 (see FIG. 8). As shown below, the mating surface 100 of rim 52 mates with a corresponding mating surface 101 (see FIG. 7B) of the detachable seat 60 in the assembled state of the structure. The axis of the circular cavity 53 crosses the mating surface 100 of the rim 52 at a selected angle of inclination which is substantially equal to the angle of inclination of the leg to the bottom of the casing. As best viewed in FIG. 6A, the rim 52 is provided with four through holes 54, each of which is formed of a larger sized contour portion 54a and a smaller sized contour portion 54b communicating with each other.

In the case of the present embodiment, the larger contour portion 54a takes the form of a circular hole and the smaller contour portion 54b a slot whose width is smaller than the diameter of the circular hole. Each of the slots 54b extend from the associated circular holes 54a substantially in the same direction. The rim 52 is further provided with at least one through hole 55 which receives a bolt which attaches the fixed seat 50 to the casing 1. As clearly shown in FIG. 6C, the through hole 55 is provided with a countersunk head 55a on the mating surface side of the rim 52.

Figure 6C:
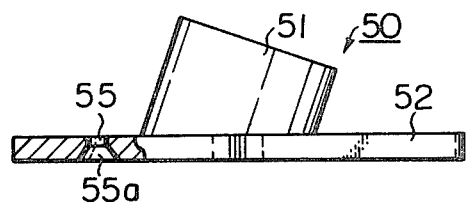
FIG. 6C is a side view, partly in section along the line C—C in FIG. 6A, of the fixed seat shown in FIG. 6A.
Figure 7A:
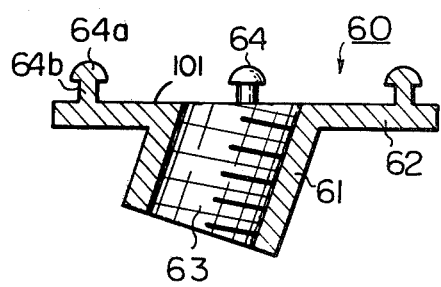
FIG. 7A is a top view of the detachable seat used in the connecting structure shown in FIG. 5.
Figure 7B:
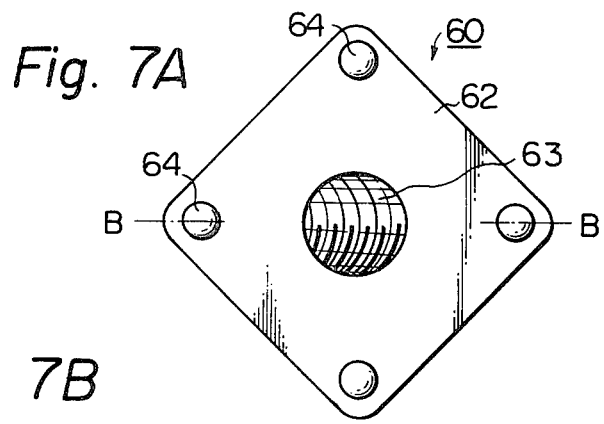
FIG. 7B is a section taken along the line B—B in FIG. 7A.

One embodiment of the detachable seat 60 to be coupled to the fixed seat 50 of FIGS. 6A through 6C is shown in FIGS. 7A and 7B. In this embodiment the detachable seat 60 comprises a tubular center stay 61 and a rim 62 surrounding the center stay 61 and having a mating surface 101 on the side opposite the center stay 61. The mating surface 101 is adapted to mate with mating surface 100 of the rim 52 of the fixed seat 50. The center stay 61 has a threaded hole 63 and the axial direction of the hole 63 crosses the mating surface 101 of the rim 62 at a selected angle of inclination which substantially corresponds to the angle of inclination of the axial direction of the circular cavity 53 with respect to the mating surface 100 of the fixed seat 50. At positions substantially corresponding to the through holes 54 of the fixed seat 50, a corresponding number of projections 64 are formed on the mating surface 101 of the rim 62. Each of the projections 64 is designed to have an end bulge 64a connected to the mating surface 101 via a pole 64b.

The dimension of the end bulge 64a is sufficiently large to permit free passage of the bulge through the larger sized contour portion 54a of hole 54 but to retard passage of the bulge through the smaller sized contour portion 54b of the hole 54. The dimension of the pole 64b is sufficiently small to permit free passage of the pole 64b through both the larger and smaller sized contour portions 54a, 54b of the through hole 54. The length of the pole 64b is longer than the depth of hole 54 in order that the projection 64 is freely slideable from the large contour portion 54a into the small sized contour portion 54b of the through hole 54 after the projection 64 has been inserted into portion 54a and surfaces 100, 101 placed in mating contact. In the preferred embodiment, the projection 64 is of a mushroom-shaped construction. That is, the projection 64 is consist of a semi-spherical end bulge 64a and a circular pole 64b. The diameter of the semi-spherical end bulge 64a of the projection 64 is slightly smaller than that of the circular hole 54a but larger than the width of the slot 54b in the fixed seat rim 52, respectively. Whereas the diameter of the circular pole 64b of the projection 64 is slightly smaller than the width of the slot 54b and the axial length of the circular pole 64b is slightly larger than the thickness of the fixed seat rim 52.

Figure 8:
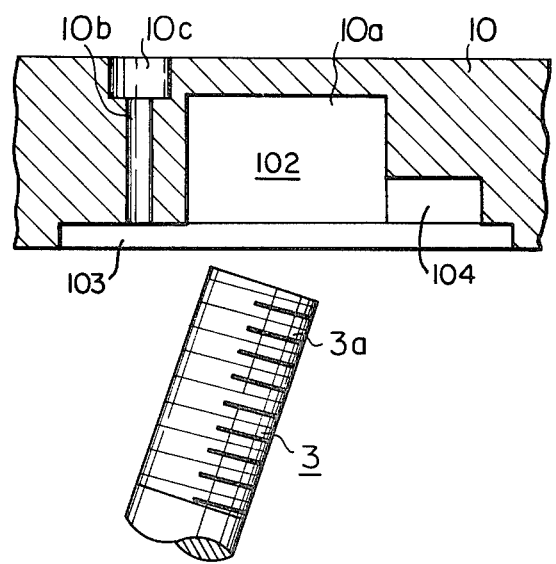
FIG. 8 is a side view, partly in section, of the bottom board of the massive body and the leg to be connected to each other via the connecting structure shown in FIG. 5, FIGS. 9A through 9D are side views, partly in section, for showing the process of connecting the leg to the massive body using the connecting structure shown in FIG. 5.

One example of the constructions of the casing 1 and the leg 3 which are adapted for connection via the connecting structure in accordance with the present invention is shown in FIG. 8. The bottom board 10 of the casing 1 has a bottom hollow 10a and through holes 10b for the bolts 71 (see FIG. 9A) which attach the seat 50 to the casing 1. The hollow 10a includes a deeply scooped center portion 102 adapted to fully accommodate the center portion 51 of the fixed seat 50, a shallowly scooped flared portion 103 adapted to fully accommodate the rim 52 of the fixed seat 50 and at least one local cut-out 104, formed in the flared portion 103 and adapted to accommodate the projection 64 of the detachable seat 60 when the latter is coupled to the fixed seat 50 as hereinafter described in more detail. The through holes 10b for the bolts 71 open into the flared portion 103 and are each associated with an enlarged recess 10c on the side opposite to the flared portion 103. The leg 3 is provided with an outer thread 3a formed on the top portion thereof which is suited for screw engagement with the threaded hole 63 in the detachable seat stay 61. In this connection, the diameter of the circular cavity 53 of the fixed seat center portion 51 (see FIG. 6B) is larger than the outermost diameter of the leg thread 3a.

Connection of the leg 3 to the casing is carried out in the following manner.

Figure 9A:
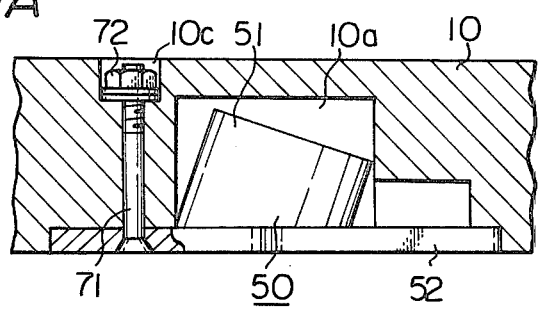

The fixed seat 50 is set to the bottom of the casing bottom board 10 with the center portion 51 and the rim 52 thereof being fully received in the bottom hollow 10a as shown in FIG. 9A and is turned somewhat until the positions of the through holes 55 (see FIG. 6C) are registered with the corresponding through holes 10b (See FIG. 8) in the bottom board 10. Next, a bolt 71 is inserted into each through hole 10b from the bottom side and fastened by a nut 72 set in the enlarged recess 10c.

Figure 9B:
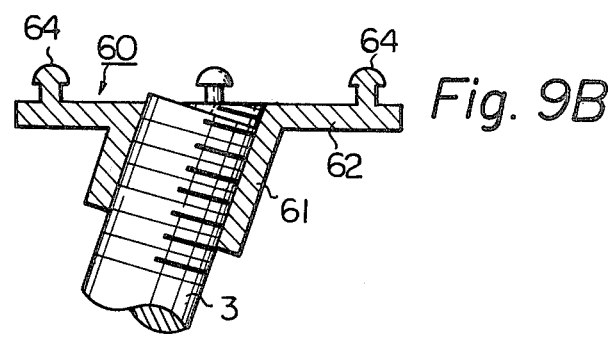

After mounting the fixed seat 50 to the casing bottom board 10, the leg top thread 3a is provisionally screwed into the threaded hole 63 of the detachable seat to such an extent that the top end of the leg 3 does not extend excessively beyond the mating surface of the rim 62 as shown in FIG. 9B in order not to hinder the later-described sliding between the two seats.

Figure 9C:
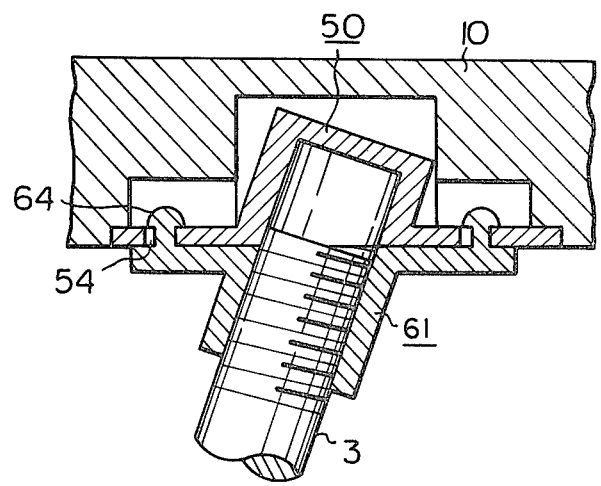

For coupling of the two seats 50 and 60, the projections 64 of the detachable seat 60 are all inserted into the larger sized contour portions 54a of the corresponding through holes 54 in the fixed seat rim 52 and the detachable seat 60 is slid laterally against the fixed seat 50 so that the poles 64b of the projections 64 are all located in the smaller sized contour portions 54b of the corresponding through hole 54 as shown in FIG. 9C.

Figure 9D:
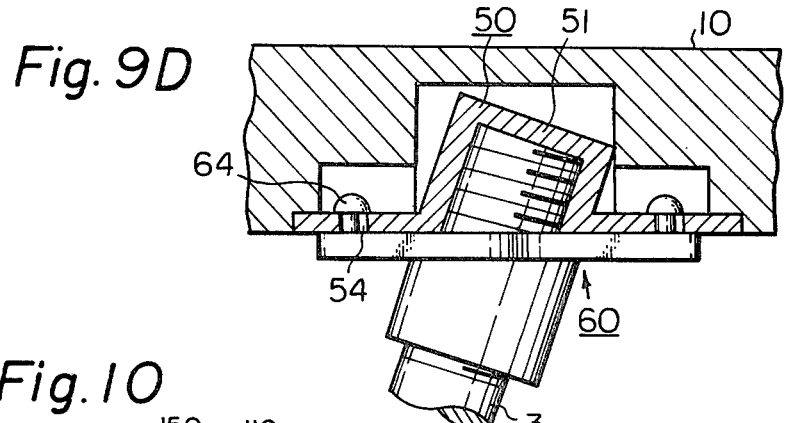

After the projections 64 have been located in portions 54, the leg 3 is further screwed into the detachable seat center stay 61 until the top end thereof is brought into tight pressure contact with the inner end wall of the fixed seat center portion 51 as shown in FIG. 9D, whereby the leg 3 is firmly connected to the casing via the connecting structure in accordance with the present invention. That is, the poles 64b are not allowed to move towards the larger sized contour portions 54a of the corresponding through holes 54.

In the above-described process, the leg 3 is first coupled to the detachable seat 60 which is then separate from the fixed seat 50 already mounted to the casing bottom. Then, coupling of the two seats 50 and 60 is carried out simply by registering the projections 64 of the detachable seat 60 at the larger sized contour portions 54a of the through holes 54 in the fixed seat 50. This registration can be carried out by groping only, i.e. the operation is very simple. Collimation between axes of the leg 3 and the fixed seat center portion 51 can be attained simply by laterally sliding the detachable seat 60 against the fixed seat 50. This operation is very simple also. In addition, the thread 3a on the leg 3 is completely covered and protected by the center stay 61 of the detachable seat 60 during the above-described registration and collimation. Thus, when the present invention is employed, the operation necessary for the collimation is very simple and easy to attain and the thread construction is quite free from breakage to be conventionally caused by faulty collimation.

Further advantage of the present invention is resulted from the assembled construction in FIG. 9D. It should be appreciated that lateral force or forces imposed on the casing is borne not only by the thread construction but also by the wedge engagement between the two cooperating seats via the projections. This alleviated stress concentration assures longer life of the thread construction when compared with the conventional connecting structures.

Embracing of the leg top thread by the detachable seat stay effectively prevents undesirable shaky movement of the leg which would otherwise seriously assists damage of the thread construction.

In the assembled condition shown in FIG. 9D, the top end of the leg 3 firmly presses the inner end wall of the fixed seat center portion 51 and this pressure tends to forcibly separate the two seats 50 and 60 from each other, whereby the wedge engagement via the projections 64 is strongly locked. Thus, the coupling between the leg and the casing via the two seats is remarkably stabilized.

Figure 10:
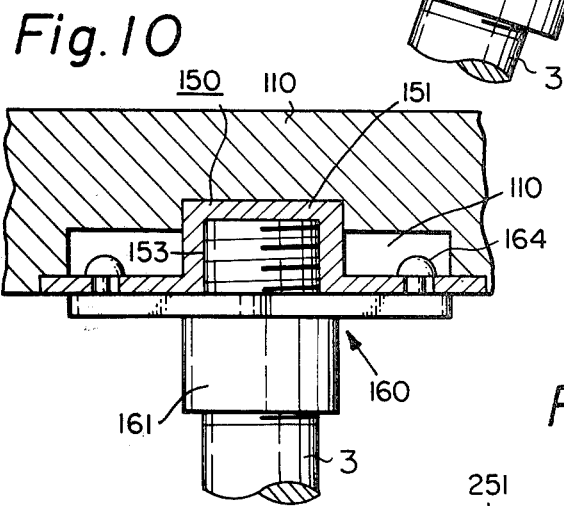
FIG. 10 is a side view, partly in section, of another embodiment of the connecting structure in accordance with the present invention.

A modified embodiment of the connecting structure in accordance with the present invention is shown in FIG. 10, in which the axial direction of the circular cavity 153 of the fixed seat center portion 151 crosses the mating surface at substantially a right angle and, likewise, the axial direction of the threaded hole 163 of the detachable seat center stay 161 crosses the mating surface at substantially a right angle. This arrangement is clearly suited for legs standing almost vertically on the floor.

Figure 11:
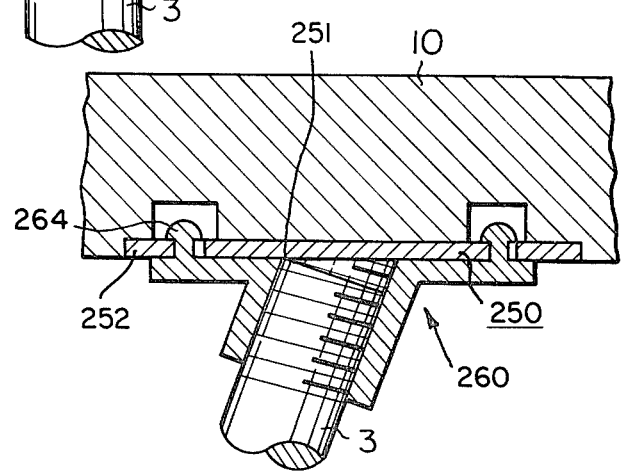
FIG. 11 is a side view, partly in section, of the other embodiment of the connecting structure in accordance with the present invention.

A further modified embodiment of the connecting structure in accordance with the present invention is shown in FIG. 11, in which the center portion 251 of the fixed seat 250 lies in the same plane as the rim 252. In this case, it is sufficient for the casing bottom board 210 to have the bottom hollow 210A comprised of the shallow flaring portion and the local cut-outs only. In the assembled condition, the top end of the leg 3 firmly presses the fixed seat 250 about the center thereof upwardly in order to fasten the wedge engagement via the projections 264.

Figure 12:
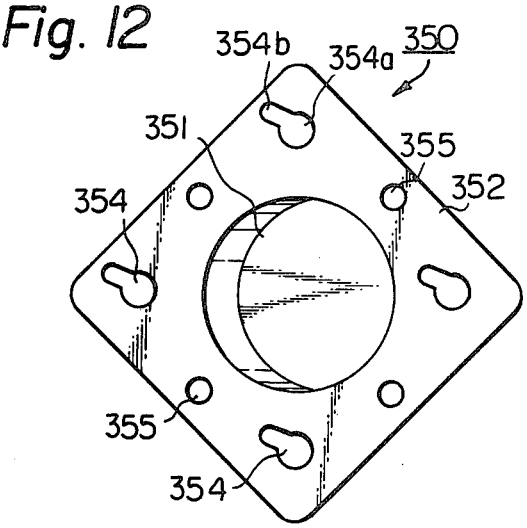
FIG. 12 is a top view of a variant of the fixed seat shown in FIG. 6A.
Figure 13A:
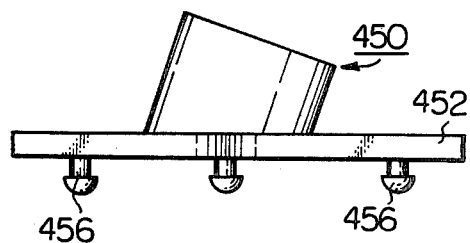
FIG. 13A is a side view of the fixed seat used in a modified embodiment of the present invention.
Figure 13B:
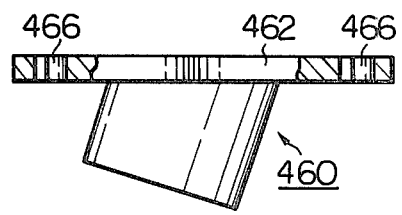
FIG. 13B is a side view, partly in section, of a detachable seat to be used in combination with the fixed seat shown in FIG. 13A.

In the embodiment shown in FIG. 12, the smaller sized contour portions 354b of the through holes 354 extend in arc with respect to the center of the seat 350 and, in this case, collimation between the two seats 350 and 60 is carried out by axially and slidably turning the detachable seat 360 against the fixed seat 350. A further modified embodiment of the connecting structure in accordance with the present invention is shown in FIGS. 13A and 13B.

In the case of this embodiment, projections 456 are formed on the mating surface of the rim 452 of the fixed seat 450 whereas through holes 66' cooperable with the projections 456 for the wedge engagement are formed in the rim 462 of the detachable seat 460.

I claim:

1. An improved mounting structure for attaching a support leg to a massive body, said mounting structure comprising:

a support leg having first and second ends and an externally threaded top portion adjacent said first end;

a fixed seat mounted on the bottom of said massive body, said fixed seat including a center portion and a rim surrounding said center portion, said rim having a first mating surface;

a detachable seat having an internally threaded tubular stay and a rim surrounding said tubular stay, said internally threaded tubular stay being adapted to threadably engage said externally threaded top portion of said support leg when said first end is inserted into said tubular stay, said detachable seat rim having a second mating surface adapted to mate with said first mating surface of said fixed seat rim when said first and second mating surfaces are pressed against one another;

said rim of one of said fixed and detachable seats including a through hole formed therein, said through hole including a larger sized contour portion and a smaller sized contour portion opening into said larger sized contour portion;

said rim of the other of said fixed and detachable seats including a projection formed thereon, said projection including an end bulge spaced from said mating surface of said other of said fixed and detachable seats by a pole, the size of said end bulge being less than said larger sized contour portion and greater than said smaller sized contour portion such that said end bulge is free to pass through said larger contour portion but is not free to pass through said smaller contour portion, the length of said pole being greater than the depth of said through hole such that said bulge may be inserted through said sized contour portion of said through hole and slid over said sized contour portion of said through hole;

said fixed and detachable seats being coupled to each other with said pole of said projection being positioned within said smaller contour of said through hole in such a manner that said first and second mating surfaces are adjacent one another; and said support leg being threaded into said tubular stay by a sufficient amount that said first end of said support leg comes into sufficient pressure contact with said center portion of said fixed seat to cause said fixed and detachable seats to separate and thereby causing said bulge to come into firm pressure contact with a portion of said rim of said one of said fixed and detachable seats whereby a firm coupling is established between said fixed and detachable seats.

2. The improved structure of claim 1 wherein said through hole is formed in said detachable seat and said projection is formed on said fixed seat.

3. The improved structure of claim 1 wherein said through hole is formed in said fixed seat and said projection is formed in said detachable seat.

4. The improved structure as claimed in claim 1 wherein said fixed seat is a flat disc made up of said center portion and said rim.

5. The improved structure as claimed in claim 1 wherein the axis of said center stay of said detachable seat crosses said second mating surface at substantially a right angle.

6. The improved structure as claimed in claim 4 wherein the axis of said center stay of said detachable seat crosses said second mating surface at a prescribed angle of inclination which is substantially equal to that of said leg with respect to said bottom of said massive body.

7. The improved structure as claimed in claim 1 wherein said center portion of said fixed seat projects from said rim on the side opposite said first mating surface in order to define a circular cavity opening in said first mating surface, the diameter of said circular cavity being larger than the outermost diameter of said threaded top portion of said leg.

8. The improved structure as claimed in claim 7 wherein the axis of said center portion of said fixed seat crosses said first mating surface at substantially a right angle and, the axis of said center stay of said detachable seat crosses said second mating surface at substantially a right angle.

9. The improved structure as claimed in claim 7 wherein the axis of said center portion of said fixed seat crosses said first mating surface at a prescribed angle of inclination, the axis of said center stay of said detachable seat crosses said second mating surface at the equal angle of inclination and said inclination is substantially equal to that of said leg with respect to said bottom of said massive body.

10. The improved structure as claimed in claim 1 wherein in which said larger sized contour portion of said through hole of said fixed rim is a circular hole and said smaller sized contour portion is a slot extending from said circular hole.

11. The improved structure as claimed in claim 1 wherein said projection comprises a circular pole and a semi-spherical end bulge.

12. The improved structure as claimed in claim 1 wherein, said fixed seat includes a second through hole having a larger sized contour portion and a small sized contour portion opening into said larger sized contour portion, each of said smaller sized contour portions extending in substantially the same direction.

* * * * *